(12) United States Patent
Baker et al.

(10) Patent No.: US 10,330,477 B2
(45) Date of Patent: Jun. 25, 2019

(54) RING LASER GYROSCOPE WITH ION MIGRATION FIELD REDUCER SHIELD

(71) Applicant: Honeywell International Inc., Morris Plains, NJ (US)

(72) Inventors: Stephen Matthew Baker, Ham Lake, MN (US); Dean Eivind Johnson, Orono, MN (US); Matthew Clark, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 177 days.

(21) Appl. No.: 15/452,961

(22) Filed: Mar. 8, 2017

(65) Prior Publication Data
US 2018/0259336 A1 Sep. 13, 2018

(51) Int. Cl.
*G01C 19/66* (2006.01)
*H01S 3/083* (2006.01)

(52) U.S. Cl.
CPC .......... *G01C 19/661* (2013.01); *H01S 3/0835* (2013.01)

(58) Field of Classification Search
CPC ...... H01S 3/083; H01S 3/0835; H01S 3/0323; H01S 3/0326; G01C 19/665; G01C 19/66
See application file for complete search history.

(56) References Cited

U.S. PATENT DOCUMENTS

| | | | |
|---|---|---|---|
| 4,007,431 A * | 2/1976 | Abbink | H01S 3/0385 313/632 |
| 4,672,624 A * | 6/1987 | Ford | H01S 3/038 356/459 |
| 5,098,189 A | 3/1992 | vonBieren | |
| 5,432,604 A | 7/1995 | Canfield et al. | |
| 5,856,995 A | 1/1999 | Morris | |
| 6,025,914 A | 2/2000 | Ford et al. | |
| 6,714,580 B2 | 3/2004 | Ecklund et al. | |
| 7,058,111 B2 | 6/2006 | Seiber | |
| 9,389,080 B2 | 7/2016 | Schober et al. | |
| 9,551,578 B1 | 1/2017 | Baker et al. | |
| 2004/0008351 A1* | 1/2004 | Ecklund | G01C 19/661 356/459 |
| 2013/0141732 A1* | 6/2013 | Mary | H05K 1/0296 356/459 |
| 2013/0329229 A1 | 12/2013 | Alexandre | |
| 2014/0340687 A1* | 11/2014 | David | G01C 19/661 356/459 |

FOREIGN PATENT DOCUMENTS

WO    WO 01/35055 A1 * 11/1999 ............. G01C 19/66

\* cited by examiner

*Primary Examiner* — Michael P LaPage
(74) *Attorney, Agent, or Firm* — Fogg & Powers LLC

(57) ABSTRACT

A ring laser gyroscope comprises a laser block that includes a resonant internal cavity defined by a plurality of surfaces of an optical closed loop pathway, and a plurality of electrodes coupled to the laser block. The electrodes are configured to generate a pair of counter-propagating laser beams from a lasing gas in the optical closed loop pathway. The ring laser gyroscope also includes a field reducer shield comprising an electrically conductive material, with the field reducer shield located completely within the laser block. The field reducer shield is configured to modify an electric field generated by the plurality of electrodes to substantially prevent ions in the laser block from migrating toward the plurality of surfaces of the optical closed loop pathway.

20 Claims, 5 Drawing Sheets

RING LASER GYROSCOPE WITH ION MIGRATION FIELD REDUCER SHIELD

BACKGROUND

A ring laser gyroscope typically includes a solid block of a glass material having a plurality of interconnected passages that are arranged in a closed loop to create a resonant cavity. Reflective surfaces are positioned at the intersection of each of the passages, and a lasing gas is contained within the resonant cavity. Electrical potentials applied to the lasing gas generate counter-propagating laser beams in the resonant cavity. The ring laser gyroscope utilizes interference of the laser beams within the resonant cavity to detect changes in orientation and rate of turn.

During operation of a ring laser gyroscope, the glass material of the solid block typically exhibits ionic migration, which is a diffusion process that is dependent on temperature and strength of the electric field within the glass material. Such ionic migration can negatively impact the life of the ring laser gyroscope. For example, ring laser gyroscopes are known to exhibit a reduction of lifetime because of lithium ion migration in the solid block that results from applied potential bias, especially at higher temperatures.

SUMMARY

A ring laser gyroscope comprises a laser block that includes a resonant internal cavity defined by a plurality of surfaces of an optical closed loop pathway, and a plurality of electrodes coupled to the laser block. The electrodes are configured to generate a pair of counter-propagating laser beams from a lasing gas in the optical closed loop pathway. The ring laser gyroscope also includes a field reducer shield comprising an electrically conductive material, with the field reducer shield located completely within the laser block. The field reducer shield is configured to modify an electric field generated by the plurality of electrodes to substantially prevent ions in the laser block from migrating toward the plurality of surfaces of the optical closed loop pathway.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A ring laser gyroscope is disclosed herein that includes an electric field reducer shield for reducing ion migration within the ring laser gyroscope. The field reducer shield disrupts and reduces the strength of the electrical field in the area where ion migration has the largest effect, thus increasing the lifetime of the ring laser gyroscope at elevated temperatures. The present approach reduces the amount of ions such as lithium ions that migrate to interior cavity locations of the ring laser gyroscope by reducing the strength of the electric field.

In one embodiment, the field reducer shield comprises a conductive material that is interposed between a dither motor (at ground) and a cathode (most negative potential) of the ring laser gyroscope. This reduces the strength of the electric field in the interior region of laser gain passageways in a laser block of the ring laser gyroscope, thereby reducing the ionic migration to the area of the cathode.

Further details of the present approach are described hereafter with reference to the drawings.

Figure 1:
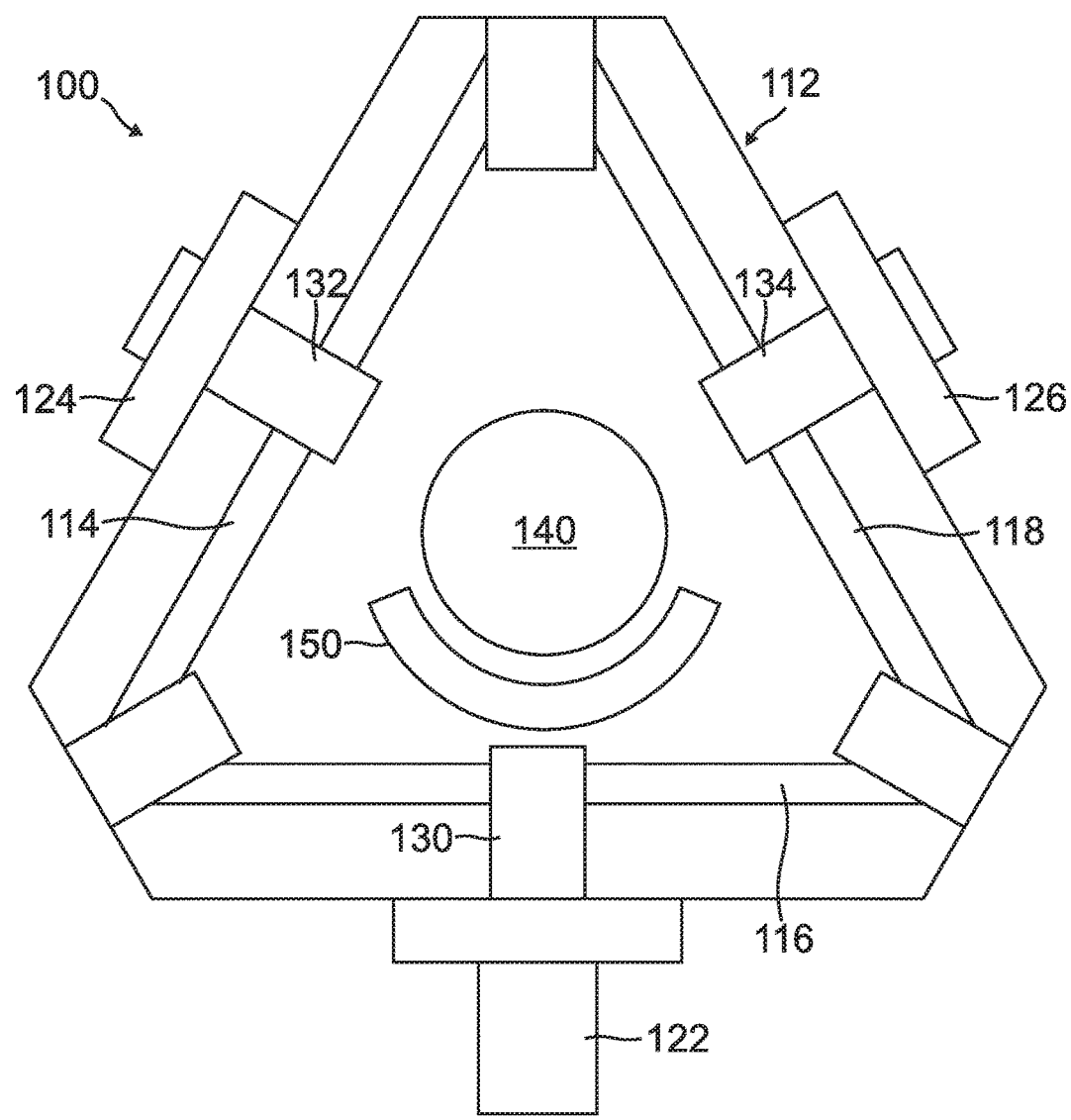
FIG. 1 is a top view of a ring laser gyroscope, which includes an electric field reducer shield according to one embodiment.

FIG. 1 illustrates a ring laser gyroscope 100 in accordance with one embodiment, which is configured to reduce ion migration. The ring laser gyroscope 100 includes a laser block 112 having a resonant cavity in the form of an optical closed loop pathway comprising a plurality of interconnected passages 114, 116, 118 that are configured to be filled with a lasing gas, such as a mixture of helium and neon.

The ring laser gyroscope 100 further includes a cathode 122 mounted on one side of laser block 112, and a pair of anodes 124, 126 mounted on the other opposing sides of laser block assembly 112. The cathode 122 is in communication with passage 116 through a first channel 130 in laser block 112. The anode 124 is in communication with passage 114 through a second channel 132 in laser block 112. The anode 126 is in communication with passage 118 through a third channel 134 in laser block 112.

The cathode 122 and anodes 124, 126 are configured to generate an electric potential through the lasing gas in interconnected passages 114, 116, 118. This creates a gas plasma discharge region between cathode 122 and anodes 124, 126. When the gas plasma discharge region is excited by a sufficient voltage, gas discharge currents flow in opposite directions, from anode 124 to cathode 122 and from anode 126 to cathode 122. These gas discharge currents generate a pair of counter-propagating laser beams within the optical closed loop pathway. Rotation of ring laser gyroscope 100 causes the effective path length for the pair of laser beams to change, thus producing a frequency difference between the two beams, which can be used to determine the angular rate.

In one embodiment, anodes 124, 126 are coupled to a first voltage source such that anodes 124, 126 have a first negative electric potential, and cathode 122 is coupled to a second voltage source such that cathode 122 has second negative electric potential that is less than the first negative electric potential.

The laser block 112 can be mounted to a chassis of ring laser gyroscope 100 via a dither motor 140. In some embodiments, dither motor 140 comprises a piezoelectric dither motor, which is operatively coupled to an electrical drive circuit. The electric potential of the chassis coupled to dither motor 140 defines a case ground potential or reference voltage for ring laser gyroscope 100. As a result, the portion of laser block 112 in contact with dither motor 140 is maintained at the potential of dither motor 140, such as ground potential. A dither motor voltage is applied to dither motor 140 by a voltage source, which may be implemented using any convenient power supply or voltage source available within ring laser gyroscope 100. The dither motor 140, when energized, performs a dithering of the rotation sensing axis of laser block 112, as understood and known to those of ordinary skill in the art.

The laser block 112 can be composed of a glass ceramic material such as, but not limited to, lithium aluminosilicate (e.g., Zerodur® glass-ceramic). Within the glass ceramic material of laser block 112, mobile ionic agents such as lithium ions are present that are very mobile. Under the influence of an electric field, and even more so at elevated temperatures where diffusion and mobility is higher, these ions migrate in laser block 112, resulting in deleterious effects that cause shorter discharge life.

Accordingly, an electric field reducer shield 150 is located completely within laser block 112. The field reducer shield 150 is configured to reduce migration of ions in laser block 112 by reducing an electric field generated by cathode 122 and anodes 124, 126. The field reducer shield 150 is coupled to a voltage source such that it has an intermediate electric potential that is between the first negative electric potential of anodes 124, 126 and the second negative electric potential of cathode 122. The field reducer shield 150 modifies an electrical gradient between dither motor 140 and cathode 122.

The field reducer shield 150 is composed of a conductive material such as a metal or metal alloy. Exemplary materials for field reducer shield 150 include copper, aluminum, nickel-iron alloys (e.g., Invar), and the like. In some embodiments, field reducer shield 150 can be implemented in the form of a conductive film formed on a substrate, a bulk piece of metal, or the like. The field reducer shield 150 can be formed in laser block 112 using standard fabrication processes, known to those of ordinary skill in the art.

As shown in FIG. 1, field reducer shield 150 can be located between dither motor 140 and cathode 122, around the area adjacent to dither motor 140, and away from cathode 122. In this embodiment, field reducer shield 150 comprises a unitary conductive segment having a curved, semi-circular shape around dither motor 140.

As described hereafter, in other embodiments the field reducer shield can take other sizes and shapes.

The modified gradient that results from the shield reduces the mobility of ionic agents such as lithium ions within the glass ceramic material of the laser block by reducing the electric field within the glass ceramic material. Controlling this electric field with the shield provides for the desired reduction in diffusion/mobility of the mobile ionic agents while avoiding any need to re-design the electronic control power sources that energize the discharge within the laser block or any associated rotation sensing circuitry.

Figure 2:
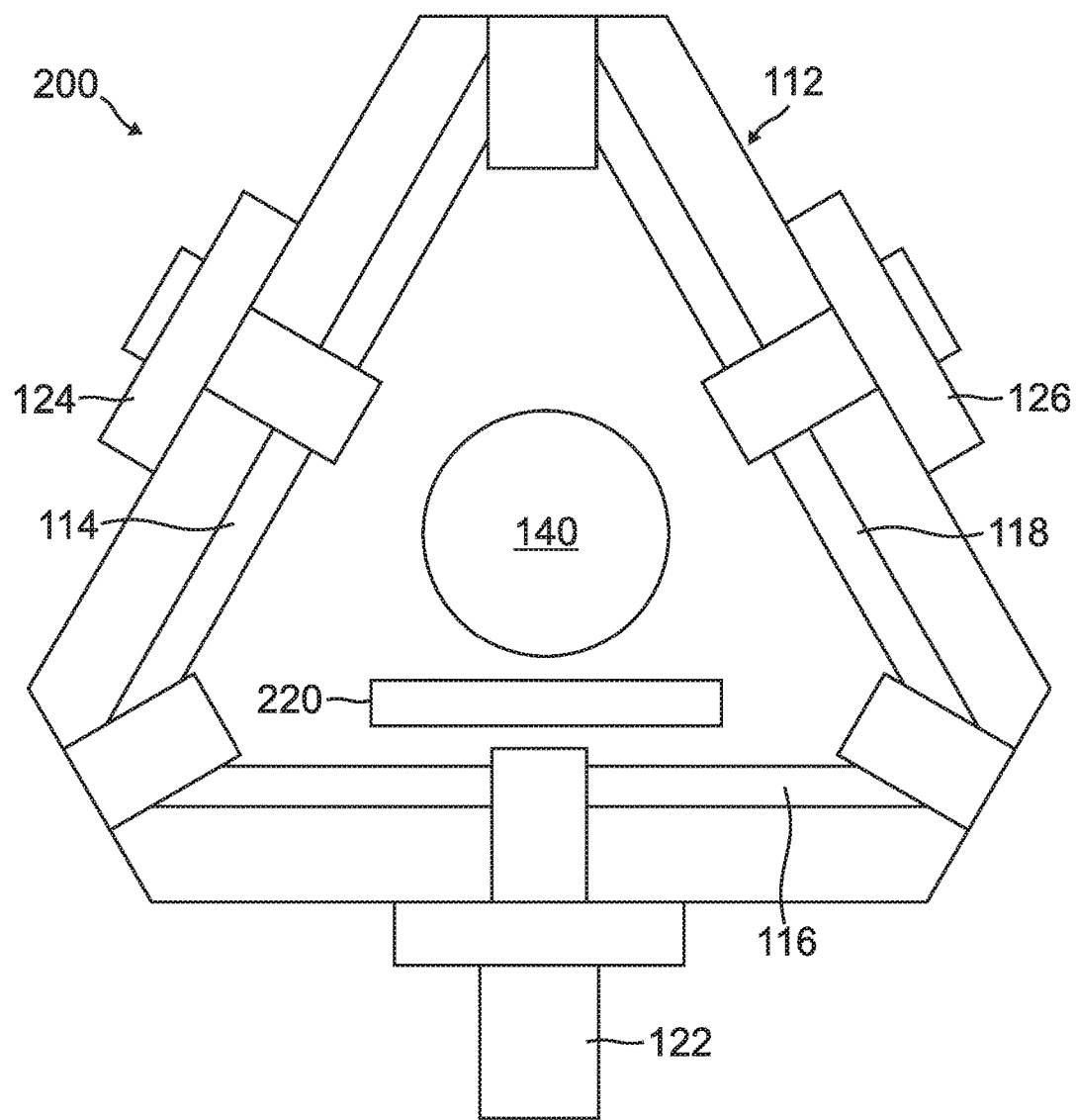
FIG. 2 is a top view of a ring laser gyroscope, which includes an electric field reducer shield according to another embodiment.

FIG. 2 illustrates a ring laser gyroscope 200, which includes an electric field reducer shield according to another embodiment. The ring laser gyroscope 200 includes similar components as described above for FIG. 1, including a laser block 112 having a resonant cavity in the form of an optical closed loop pathway comprising a plurality of interconnected passages 114, 116, 118 that are configured to be filled with a lasing gas. The ring laser gyroscope 200 further includes a cathode 122 mounted on one side of laser block 112, and a pair of anodes 124, 126 mounted on the other opposing sides of laser block assembly 112. The laser block 112 can be mounted to a chassis of ring laser gyroscope 200 via a dither motor 140.

In the embodiment of FIG. 2, an electric field reducer shield 220 is located completely within laser block 112. The field reducer shield 220 is configured to reduce migration of ions in laser block 112 by modifying an electric field generated by cathode 122 and anodes 124, 126. The field reducer shield 220 is coupled to a voltage source such that it has an intermediate electric potential that is between a first negative electric potential of anodes 124, 126 and a second negative electric potential of cathode 122.

The field reducer shield 220 is composed of a conductive material, such as those described previously for field reducer shield 150. The field reducer shield 220 can be formed in laser block 112 using standard fabrication processes. As shown in FIG. 2, field reducer shield 220 is located between dither motor 140 and cathode 122, in the area adjacent to dither motor 140, and away from cathode 122. In this embodiment, field reducer shield 220 comprises a unitary conductive segment having a straight configuration.

Figure 3:
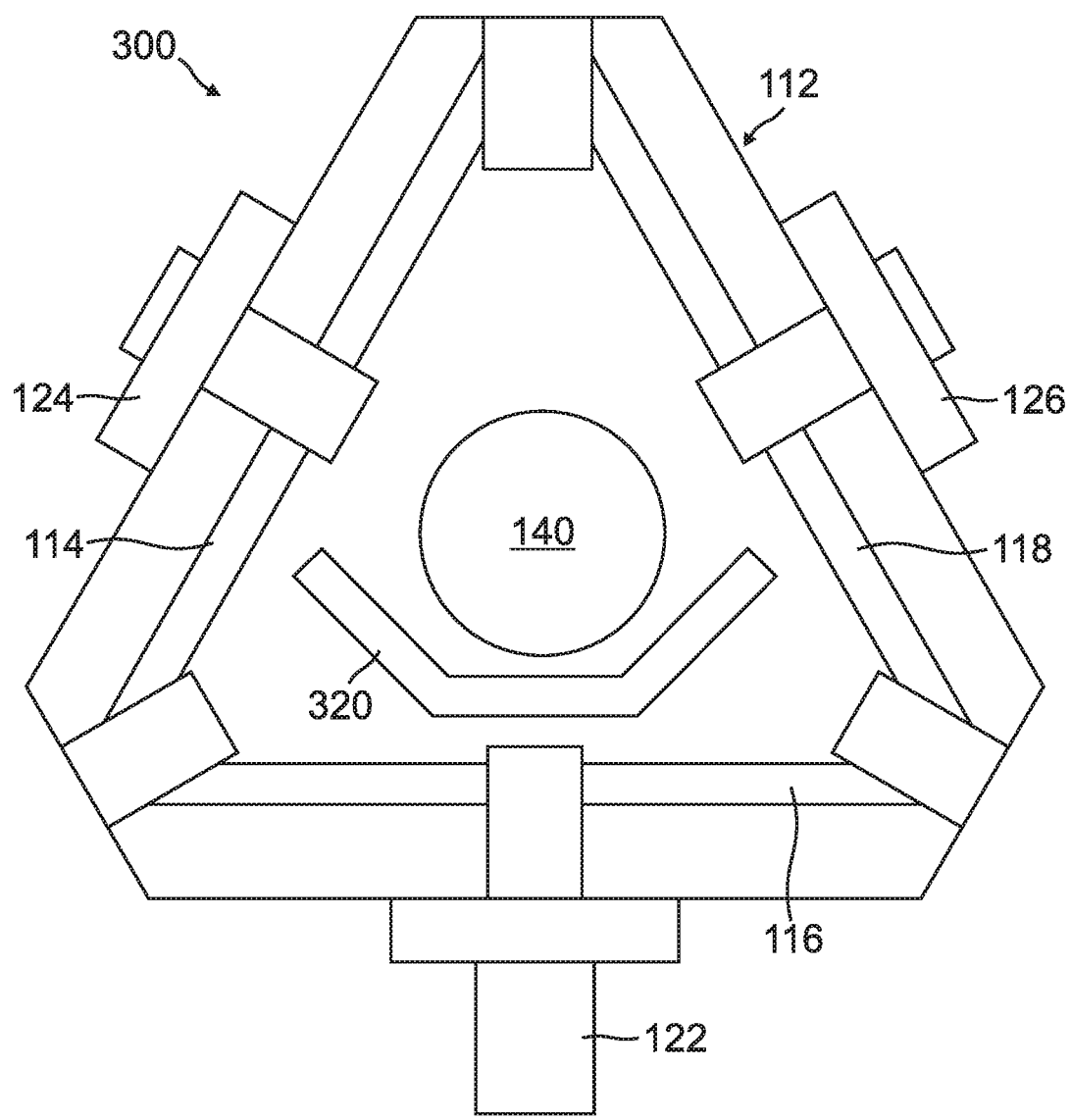
FIG. 3 is a top view of a ring laser gyroscope, which includes an electric field reducer shield according to a further embodiment.

FIG. 3 illustrates a ring laser gyroscope 300, which includes an electric field reducer shield according to a further embodiment. The ring laser gyroscope 300 includes similar components as described above for FIG. 1, including a laser block 112 having a resonant cavity in the form of an optical closed loop pathway comprising a plurality of interconnected passages 114, 116, 118 that are configured to be filled with a lasing gas. The ring laser gyroscope 300 further includes a cathode 122 mounted on one side of laser block 112, and a pair of anodes 124, 126 mounted on the other opposing sides of laser block assembly 112. The laser block 112 can be mounted to a chassis of ring laser gyroscope 300 via a dither motor 140.

In the embodiment of FIG. 3, an electric field reducer shield 320 is located completely within laser block 112. The field reducer shield 320 is configured to reduce migration of ions in laser block 112 by modifying an electric field generated by cathode 122 and anodes 124, 126. The field reducer shield 320 is coupled to a voltage source such that it has an intermediate electric potential that is between a first negative electric potential of anodes 124, 126 and a second negative electric potential of cathode 122.

The field reducer shield 320 is composed of a conductive material, such as those described previously for field reducer shield 150. The field reducer shield 320 can be formed in laser block 112 using standard fabrication processes. As shown in FIG. 3, field reducer shield 320 is located between dither motor 140 and cathode 122, in the area adjacent to dither motor 140, and away from cathode 122. In this embodiment, field reducer shield 320 comprises a unitary conductive segment having an angled configuration around dither motor 140.

Figure 4:
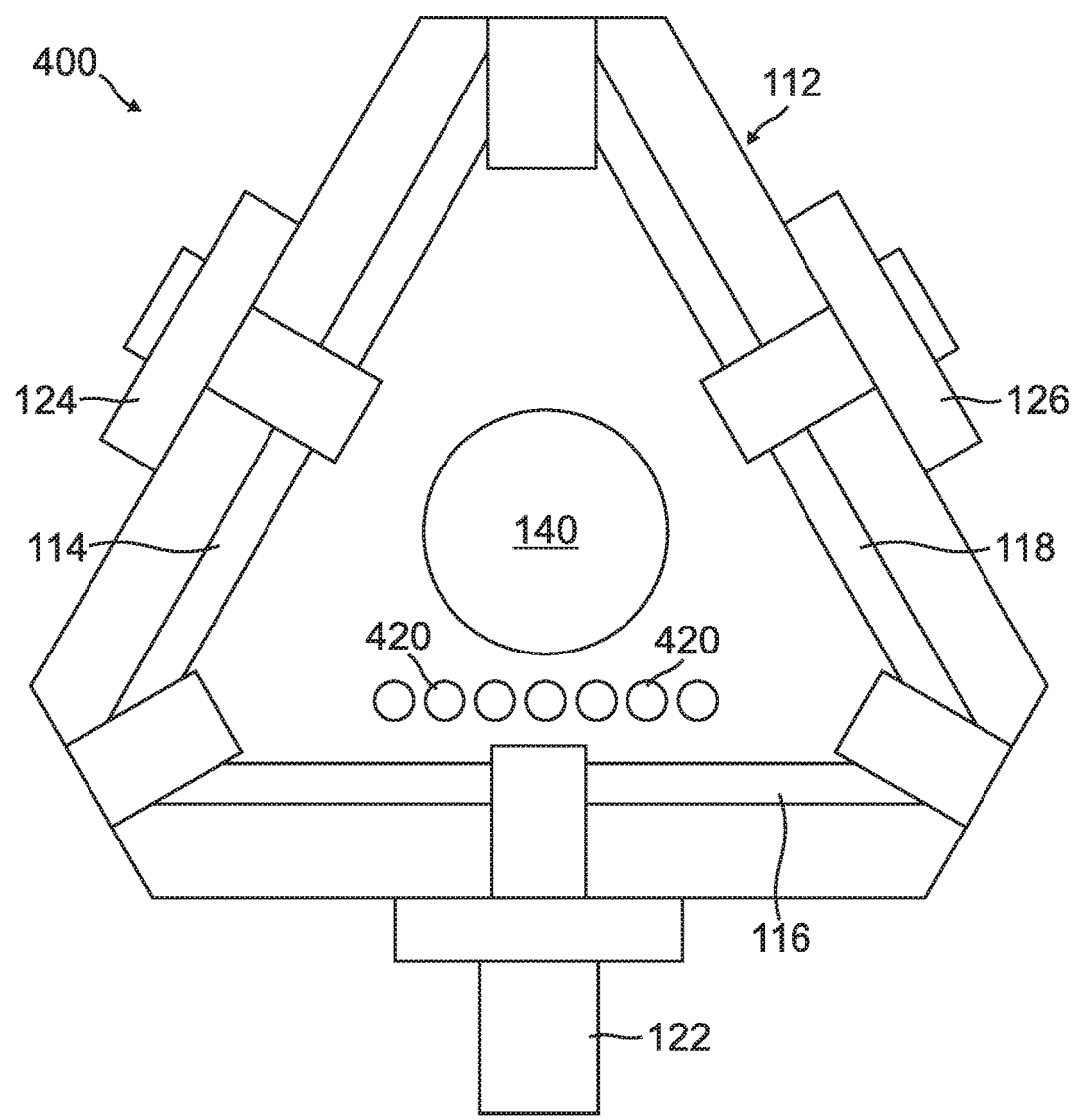
FIG. 4 is a top view of a ring laser gyroscope, which includes an electric field reducer shield according to an alternative embodiment.

FIG. 4 illustrates a ring laser gyroscope 400, which includes an electric field reducer shield according to an alternative embodiment. The ring laser gyroscope 400 includes similar components as described above for FIG. 1, including a laser block 112 having a resonant cavity in the form of an optical closed loop pathway comprising a plurality of interconnected passages 114, 116, 118 that are configured to be filled with a lasing gas. The ring laser gyroscope 400 further includes a cathode 122 mounted on one side of laser block 112, and a pair of anodes 124, 126 mounted on the other opposing sides of laser block assembly 112. The laser block 112 can be mounted to a chassis of ring laser gyroscope 400 via a dither motor 140.

In the embodiment of FIG. 4, an electric field reducer shield 420 is located completely within laser block 112. The field reducer shield 420 is configured to reduce migration of ions in laser block 112 by modifying an electric field generated by cathode 122 and anodes 124, 126. The field reducer shield 420 is coupled to a voltage source such that it has an intermediate electric potential that is between a first negative electric potential of anodes 124, 126 and a second negative electric potential of cathode 122.

The field reducer shield 420 is composed of a conductive material, such as those described previously for field reducer shield 150. The field reducer shield 420 can be formed in laser block 112 using standard fabrication processes. As shown in FIG. 4, field reducer shield 420 is located between dither motor 140 and cathode 122, in the area adjacent to dither motor 140, and away from cathode 122. In this embodiment, field reducer shield 420 comprises multiple conductive pins each separately located in laser block 112 in a substantially straight line configuration adjacent to dither motor 140.

Figure 5:
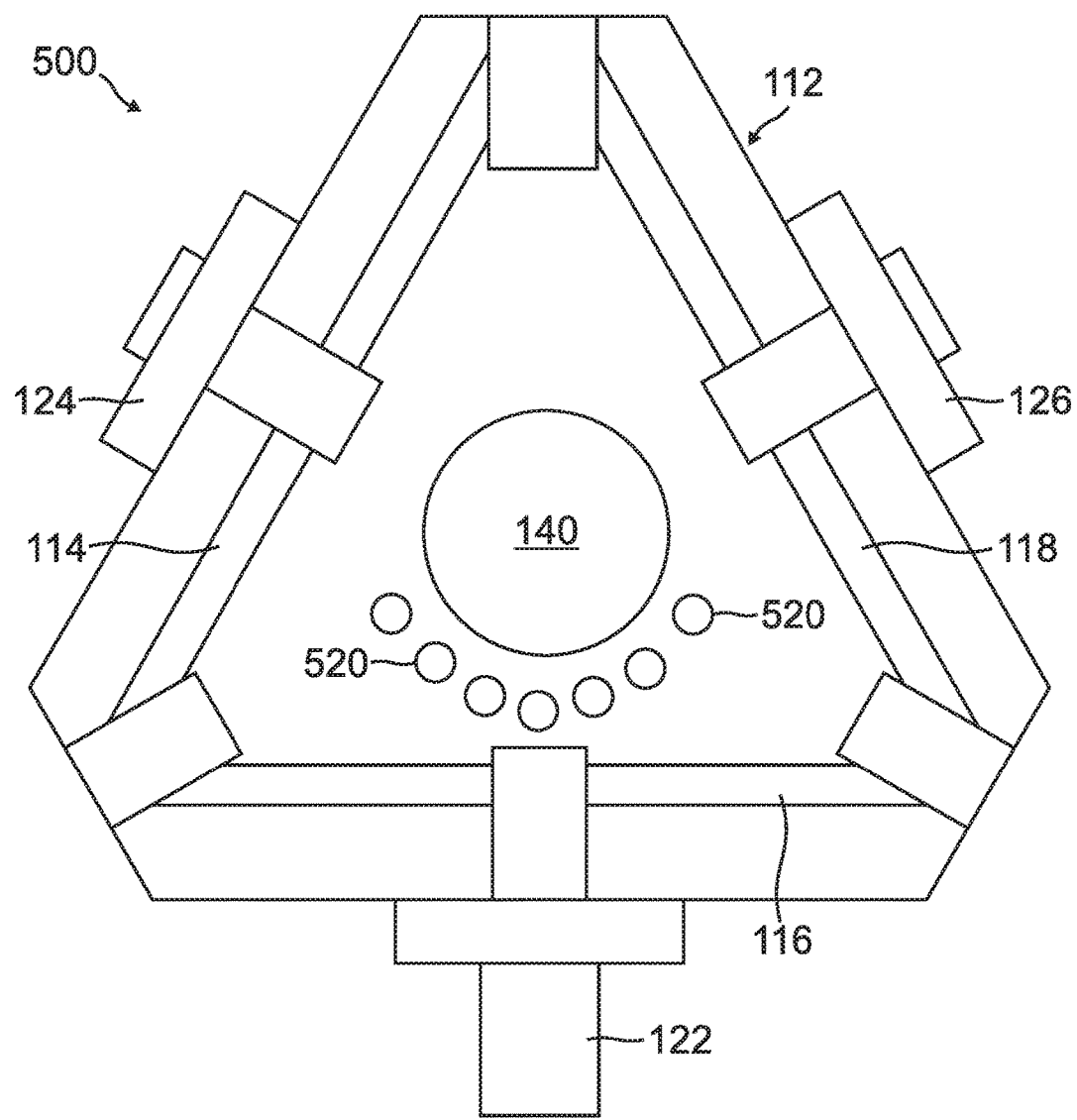
FIG. 5 is a top view of a ring laser gyroscope, which includes an electric field reducer shield according to a further alternative embodiment.

FIG. 5 illustrates a ring laser gyroscope 500, which includes an electric field reducer shield according to another alternative embodiment. The ring laser gyroscope 500 includes similar components as described above for FIG. 1, including a laser block 112 having a resonant cavity in the form of an optical closed loop pathway comprising a plurality of interconnected passages 114, 116, 118 that are configured to be filled with a lasing gas. The ring laser gyroscope 500 further includes a cathode 122 mounted on one side of laser block 112, and a pair of anodes 124, 126 mounted on the other opposing sides of laser block assembly 112. The laser block 112 can be mounted to a chassis of ring laser gyroscope 500 via a dither motor 140.

In the embodiment of FIG. 5, an electric field reducer shield 520 is located completely within laser block 112. The field reducer shield 520 is configured to reduce migration of ions in laser block 112 by modifying an electric field generated by cathode 122 and anodes 124, 126. The field reducer shield 520 is coupled to a voltage source such that it has an intermediate electric potential that is between a first negative electric potential of anodes 124, 126 and a second negative electric potential of cathode 122.

The field reducer shield 520 is composed of a conductive material, such as those described previously for field reducer shield 150. The field reducer shield 520 can be formed in laser block 112 using standard fabrication processes. As shown in FIG. 5, field reducer shield 520 is located between dither motor 140 and cathode 122, in the area adjacent to dither motor 140, and away from cathode 122. In this embodiment, field reducer shield 520 comprises multiple conductive pins each separately located in laser block 112 in a curved configuration around dither motor 140.

Example Embodiments

Example 1 includes a ring laser gyroscope, comprising: a laser block that includes a resonant internal cavity defined by a plurality of surfaces of an optical closed loop pathway; a plurality of electrodes coupled to the laser block, the electrodes configured to generate a pair of counter-propagating laser beams from a lasing gas in the optical closed loop pathway; and a field reducer shield comprising an electrically conductive material, the field reducer shield located completely within the laser block; wherein the field reducer shield is configured to modify an electric field generated by the plurality of electrodes to substantially prevent ions in the laser block from migrating toward the plurality of surfaces of the optical closed loop pathway.

Example 2 includes the ring laser gyroscope of Example 1, wherein the field reducer shield comprises a unitary conductive segment having a curved, semi-circular shape.

Example 3 includes the ring laser gyroscope of Example 1, wherein the field reducer shield comprises a unitary conductive segment having a straight configuration.

Example 4 includes the ring laser gyroscope of Example 1, wherein the field reducer shield comprises a unitary conductive segment having an angled configuration.

Example 5 includes the ring laser gyroscope of Example 1, wherein the field reducer shield comprises multiple conductive pins each separately located in the laser block in a substantially straight line configuration.

Example 6 includes the ring laser gyroscope of Example 1, wherein the field reducer shield comprises multiple conductive pins each separately located in the laser block in a curved configuration.

Example 7 includes the ring laser gyroscope of any of Examples 1-6, wherein the field reducer shield comprises a metal or metal alloy material.

Example 8 includes the ring laser gyroscope of any of Examples 1-7, wherein the field reducer shield comprises a conductive film on a substrate.

Example 9 includes the ring laser gyroscope of any of Examples 1-8, wherein the field reducer shield comprises copper, aluminum, a nickel-iron alloy, or combinations thereof.

Example 10 includes the ring laser gyroscope of any of Examples 1-9, wherein the laser block comprises a glass ceramic material.

Example 11 includes the ring laser gyroscope of Example 10, wherein the glass ceramic material comprises lithium aluminosilicate.

Example 12 includes the ring laser gyroscope of Example 11, wherein the field reducer shield reduces migration of lithium ions in the laser block.

Example 13 includes the ring laser gyroscope of any of Examples 1-12, wherein the plurality of electrodes include a cathode mounted on a first side of the laser block, a first anode mounted on a second side of the laser block, and a second anode mounted on a third side of the laser block.

Example 14 includes the ring laser gyroscope of Example 13, wherein the anodes have a first negative electric potential, and the cathode has a second negative electric potential that is less than the first negative electric potential.

Example 15 includes the ring laser gyroscope of Example 14, wherein the field reducer shield has an intermediate electric potential that is between the first negative electric potential and the second negative electric potential.

Example 16 includes the ring laser gyroscope of any of Examples 1-15, further comprising a dither motor operatively coupled with the laser block in a central area of the laser block.

Example 17 includes the ring laser gyroscope of Example 16, wherein the dither motor has a ground electric potential.

Example 18 includes the ring laser gyroscope of Example 17, wherein the field reducer shield is located between the dither motor and the cathode, such that the field reducer shield modifies an electrical gradient between the dither motor and the cathode.

Example 19 includes a ring laser gyroscope, comprising: a laser block that includes a resonant internal cavity defined by a plurality of surfaces of an optical closed loop pathway, the optical closed loop pathway configured to contain a lasing gas, wherein the laser block comprises a glass ceramic material; a plurality of electrodes coupled to the laser block, the electrodes configured to apply an electric potential through the lasing gas to create a gas plasma discharge region in the optical closed loop pathway to generate a pair of counter-propagating laser beams, wherein the plurality of electrodes include a cathode mounted on a first side of the laser block, a first anode mounted on a second side of the laser block, and a second anode mounted on a third side of the laser block; a dither motor operatively coupled with the laser block in a central area of the laser block; and a field reducer shield comprising an electrically conductive material, the field reducer shield located completely within the laser block and adjacent to the dither motor; wherein the field reducer shield is located between the dither motor and the cathode, such that the field reducer shield modifies an electrical gradient between the dither motor and the cathode, to substantially prevent ions in the laser block from migrating toward the plurality of surfaces of the optical closed loop pathway.

Example 20 includes the ring laser gyroscope of Example 19, wherein: the dither motor has a ground electric potential; the anodes have a first negative electric potential; the cathode has a second negative electric potential that is less than the first negative electric potential; and the electric field reducer shield has an intermediate electric potential that is between the first negative electric potential and the second negative electric potential.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A ring laser gyroscope, comprising:
    a laser block that includes a resonant internal cavity defined by a plurality of surfaces of an optical closed loop pathway;
    a plurality of electrodes coupled to the laser block, the electrodes configured to generate a pair of counter-propagating laser beams from a lasing gas in the optical closed loop pathway, wherein the plurality of electrodes include a cathode mounted on a first side of the laser block, a first anode mounted on a second side of the laser block, and a second anode mounted on a third side of the laser block, wherein the anodes have a first negative electric potential, and the cathode has a second negative electric potential that is less than the first negative electric potential; and
    a field reducer shield comprising an electrically conductive material, the field reducer shield located completely within the laser block, wherein the field reducer shield has an intermediate electric potential that is between the first negative electric potential and the second negative electric potential;
    wherein the field reducer shield is configured to modify an electric field generated by the plurality of electrodes to substantially prevent ions in the laser block from migrating toward the plurality of surfaces of the optical closed loop pathway.

2. The ring laser gyroscope of claim 1, wherein the field reducer shield comprises a unitary conductive segment having a curved, semi-circular shape.

3. The ring laser gyroscope of claim 1, wherein the field reducer shield comprises a unitary conductive segment having a straight configuration.

4. The ring laser gyroscope of claim 1, wherein the field reducer shield comprises a unitary conductive segment having an angled configuration.

5. The ring laser gyroscope of claim 1, wherein the field reducer shield comprises multiple conductive pins each separately located in the laser block in a substantially straight line configuration.

6. The ring laser gyroscope of claim 1, wherein the field reducer shield comprises multiple conductive pins each separately located in the laser block in a curved configuration.

7. The ring laser gyroscope of claim 1, wherein the field reducer shield comprises a metal or metal alloy material.

8. The ring laser gyroscope of claim 1, wherein the field reducer shield comprises a conductive film.

9. The ring laser gyroscope of claim 1, wherein the field reducer shield comprises copper, aluminum, a nickel-iron alloy, or combinations thereof.

10. The ring laser gyroscope of claim 1, wherein the laser block comprises a glass ceramic material.

11. The ring laser gyroscope of claim 10, wherein the glass ceramic material comprises lithium aluminosilicate.

12. The ring laser gyroscope of claim 11, wherein the field reducer shield reduces migration of lithium ions in the laser block.

13. The ring laser gyroscope of claim 1, further comprising a dither motor operatively coupled with the laser block in a central area of the laser block.

14. The ring laser gyroscope of claim 13, wherein the dither motor has a ground electric potential.

15. The ring laser gyroscope of claim 14, wherein the field reducer shield is located between the dither motor and the cathode, such that the field reducer shield modifies an electrical gradient between the dither motor and the cathode.

16. A ring laser gyroscope, comprising:
    a laser block that includes a resonant internal cavity defined by a plurality of surfaces of an optical closed loop pathway, the optical closed loop pathway configured to contain a lasing gas, wherein the laser block comprises a glass ceramic material;
    a plurality of electrodes coupled to the laser block, the electrodes configured to apply an electric potential through the lasing gas to create a gas plasma discharge region in the optical closed loop pathway to generate a pair of counter-propagating laser beams, wherein the plurality of electrodes include a cathode mounted on a first side of the laser block, a first anode mounted on a second side of the laser block, and a second anode mounted on a third side of the laser block, wherein the anodes have a first negative electric potential, and the cathode has a second negative electric potential that is less than the first negative electric potential;
    a dither motor operatively coupled with the laser block in a central area of the laser block, wherein the dither motor has a ground electric potential; and
    a field reducer shield comprising an electrically conductive material, the field reducer shield located completely within the laser block and adjacent to the dither motor, wherein the field reducer shield has an intermediate electric potential that is between the first negative electric potential and the second negative electric potential;
    wherein the field reducer shield is located between the dither motor and the cathode, such that the field reducer shield modifies an electrical gradient between the dither motor and the cathode, to substantially prevent ions in the laser block from migrating toward the plurality of surfaces of the optical closed loop pathway.

17. The ring laser gyroscope of claim 16, wherein the field reducer shield comprises a unitary conductive segment having a curved, semi-circular shape.

18. The ring laser gyroscope of claim 16, wherein the field reducer shield comprises a unitary conductive segment having a straight configuration.

19. The ring laser gyroscope of claim 16, wherein the field reducer shield comprises a unitary conductive segment having an angled configuration.

20. The ring laser gyroscope of claim 16, wherein the field reducer shield comprises multiple conductive pins each separately located in the laser block in a substantially straight line configuration or in a curved configuration.

* * * * *